United States Patent
Chen et al.

(10) Patent No.: US 11,017,142 B1
(45) Date of Patent: May 25, 2021

(54) METHODS AND APPARATUSES OF CONFIGURABLE INTEGRATED CIRCUITS

(71) Applicant: Arm Limited, Cambridge (GB)

(72) Inventors: Andy Wangkun Chen, Austin, TX (US); Shruti Aggarwal, Noida (IN); Mohit Chanana, New Delhi (IN); Hsin-Yu Chen, Austin, TX (US); Kyung Woo Kim, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/010,630

(22) Filed: Sep. 2, 2020

(51) Int. Cl.
```
G06F 30/343      (2020.01)
G06F 30/337      (2020.01)
G06F 30/20       (2020.01)
G06F 1/28        (2006.01)
G06F 119/12      (2020.01)
G06F 119/06      (2020.01)
G06F 30/3308     (2020.01)
```

(52) U.S. Cl.
CPC .............. *G06F 30/343* (2020.01); *G06F 1/28* (2013.01); *G06F 30/337* (2020.01); *G06F 30/20* (2020.01); *G06F 30/3308* (2020.01); *G06F 2119/06* (2020.01); *G06F 2119/12* (2020.01)

(58) Field of Classification Search
CPC .... G06F 30/343; G06F 30/20; G06F 30/3308; G06F 30/337; G06F 2119/06; G06F 2119/12; G06F 1/28
USPC ..................... 716/109, 111, 120, 133; 703/15
See application file for complete search history.

(56) References Cited

U.S. PATENT DOCUMENTS

| | | | | |
|---|---|---|---|---|
| 10,115,465 | B2* | 10/2018 | Ghodsi | G11C 16/349 |
| 2003/0122160 | A1* | 7/2003 | Houston | H01L 27/1104 |
| | | | | 257/207 |
| 2009/0106482 | A1* | 4/2009 | Sarin | G06F 12/0246 |
| | | | | 711/103 |
| 2012/0236648 | A1* | 9/2012 | Liska | G11C 16/0483 |
| | | | | 365/185.18 |
| 2016/0027504 | A1* | 1/2016 | Lee | G11C 16/3459 |
| | | | | 365/185.03 |

OTHER PUBLICATIONS

Chiu, "Bottom-up Memory Design Techniques for Energy-Efficient and Resilient Computing", Electrical Engineering and Computer Sciences, University of California at Berkeley, Dec. 1, 2018, 97 pages. (Year: 2018).*

* cited by examiner

*Primary Examiner* — Phallaka Kik
(74) *Attorney, Agent, or Firm* — Pramudji Law Group PLLC; Ari Pramudji

(57) ABSTRACT

According to one implementation of the present disclosure, a method includes determining one or more of a read current threshold, a leakage current threshold or a minimum assist voltage threshold; identifying a logic design, wherein the logic design is based the on one or more of the read current threshold, the leakage current threshold, or the minimum assist voltage threshold; identifying a bitcell-type and a corresponding version of the bitcell-type, wherein each version of the bitcell-type is associated with performance and power attributes of a bitcell of a memory array; and determining a memory optimization mode based on the identified logic design and the identified version of the bitcell-type.

20 Claims, 6 Drawing Sheets

METHODS AND APPARATUSES OF CONFIGURABLE INTEGRATED CIRCUITS

I. FIELD

The present disclosure is generally related to configurable integrated circuit devices.

II. DESCRIPTION OF RELATED ART

Advances in technology have resulted in smaller and more powerful computing devices. For example, a variety of portable personal computing devices, including wireless telephones, such as mobile and smart phones, tablets and laptop computers are small, lightweight, and easily carried by users. These devices can communicate voice and data packets over wireless networks. Further, many such devices incorporate additional functionality, such as a digital still camera, a digital video camera, a digital recorder, and an audio file player. Also, such devices can process executable instructions, including software applications, such as a web browser application, that can be used to access the Internet. As such, these devices can include significant computing and networking capabilities. For such devices, there is an ever-increasing demand for greater efficiency in power, performance, and area (PPA) for memory storage capacity and read/write capabilities.

III. BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, circuits or apparatuses described herein.

Figure 1:
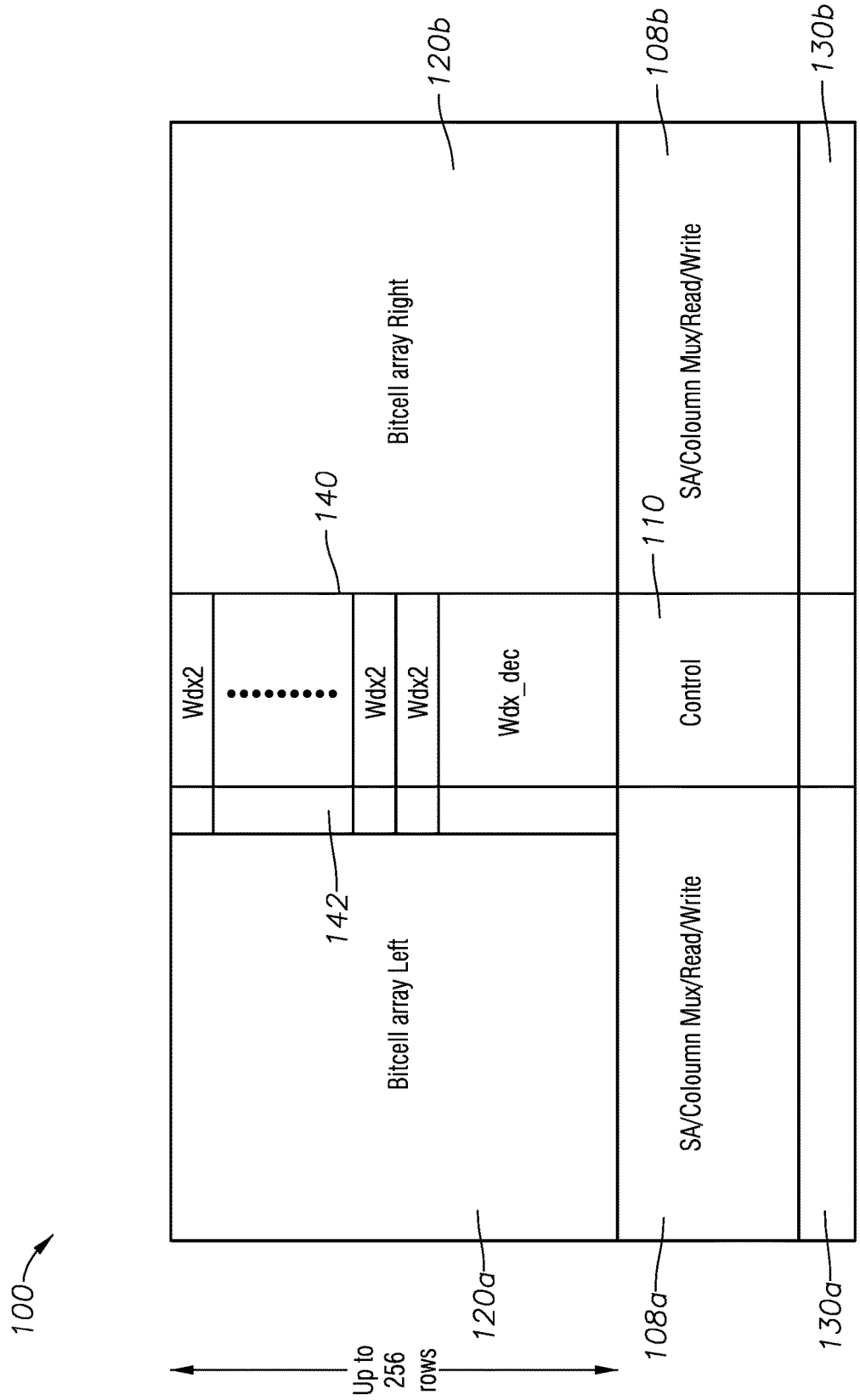
FIG. 1 is a schematic diagram of an integrated circuit in accordance with various implementations described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

IV. DETAILED DESCRIPTION

Particular implementations of the present disclosure are described below with reference to the drawings. In the description, common features are designated by common reference numbers throughout the drawings.

According to one implementation of the present disclosure, a method includes determining one or more of a read current threshold, a leakage current threshold or a minimum assist voltage threshold; identifying a logic design, where the logic design is based the on one or more of the read current threshold, the leakage current threshold or the minimum assist voltage threshold; identifying a bitcell-type and a corresponding version of the bitcell-type, where each version of the bitcell-type is associated with performance and power attributes of a bitcell of a memory array; and determining a memory optimization mode based on the identified logic design and the identified version of the bitcell-type.

According to another implementation, computer-readable storage medium comprising instructions that, when executed by a processor, cause the processor to perform operations including: determining one or more of a read current threshold, a leakage current threshold or a minimum assist voltage threshold; identifying a logic design, where the logic design is based on the one or more of the read current threshold, the leakage current threshold or the minimum assist voltage threshold; identifying a bitcell-type and a corresponding version of the bitcell-type, where each version of the bitcell-type is associated with performance and power attributes of a bitcell of a memory array; and determining a memory optimization mode based on the identified logic design and the identified version of the bitcell-type.

According to another implementation, an apparatus includes: a computer-readable storage medium; at least one processor; and program code stored on the computer-readable storage medium and configured upon execution by the at least one processor to generate an integrated circuit design, where the program code is configured to: determine one or more of a read current threshold, a leakage current threshold or a minimum assist voltage threshold; identify a logic design, where the logic design is based the on one or more of the read current threshold, the leakage current threshold or the minimum assist voltage threshold; identify a bitcell-type and a corresponding version of the bitcell-type, where each version of the bitcell-type is associated with performance and power attributes of a bitcell of a memory array; and determine a memory optimization mode based on the identified logic design and the identified version of the bitcell-type.

Advantageously, inventive aspects of the present invention allow for power, performance, area (PPA) optimized integrated circuit architecture. Accordingly, in various schemes and techniques, as described herein, the inventive aspects allow for the capacity to optimize memory compilers and fast-cache memory instances for multi-threshold offerings "on-the-fly". Accordingly, such inventive aspects may automatically optimize a memory compiler (e.g., a graphical user interface (GUI) option. Advantageously, in various implementations, systems and methods as described herein may flexibly account for power and leakage requirements of memory architecture in real-time.

Referring to FIG. 1, an example integrated circuit of a memory architecture 100 (i.e., two or more memory macros of a memory array (i.e., a memory instance) implementable on a system-on chip (SoC)) is shown. As depicted in FIG. 1, the integrated circuit 100 may include a word-line decoder block 140 (i.e., Wdx_dec) (including one or more word-line decoder circuitries (i.e.,Wdx2)), two or more memory array portions 120a, 120b, etc. (i.e., first and second bit-cell arrays) (e.g., core arrays, memory banks, memory blocks), two or more write-assist blocks 130a, 130b, etc., and a control block circuitry 110 coupled to the word-line decoder block 140, the two or more memory instances 120a, 120b, etc., and the two or more write-assist blocks 130a, 130b, etc. In addition, the example memory architecture 100 may further include two or more input/output circuits (i.e., I/O ports) (108a, 108b, etc.) respectively coupled to at least the at least two memory instances (120a, 120b, etc.) and the control block circuitry 110.

In certain implementations, each of the two or more memory array portions 120a, 120b, etc. can include up to 256 rows of individual bit-cells. In some implementations, each of the I/O circuits 108a, 108b, etc., may include respective read and write drivers, sense amplifiers, pre-charge circuits, multiplexers, and D input and Q output latches.

In certain cases, each of the word-line decoder block 140 may include a word-line post decoder and driver circuits. In a particular case, the word-line decoder blocks 140 may be configured to select word-lines coupled to the memory instances (120a, 120b, etc.) based on the control signals generated by the control block 110. In some cases, with reference to FIG. 1, the control block circuitry 110 may be configured for the selection of one or more of the memory array portions 120a, 120b, etc. In certain aspects, the control block circuitry 110 may include control sections including clock generation blocks and a configuration control logic section.

As an advantage, the inventive aspects may derive memory specific voltage threshold (VT) modes (i.e., memory optimization modes) by optimizing periphery logic and by using different bitcell-types (i.e., different bit-cell versions) (e.g., bitcell-type A and bitcell-type B as described herein) as provided by foundries. In doing so, the inventive memory optimization modes (i.e., memory specific VT modes) would utilize and (can switch/convert from) bitcell-types with the approximately similar or same aspect ratio (e.g., switching from high-speed bitcell-type A to low power bitcell-type A as described herein (or vice-versa), or alternatively, switching from high-speed bitcell-type B to low power bitcell-type B (or vice-versa), and thus maximum increases in PPA, while not incurring any area penalty.

In various examples, as described herein, the different bit-cell types may include first and second bitcell-types (i.e., bitcell-type "A" and bitcell-type "B, respectively). In certain implementations, the first bit-cell type may be larger in size than the second bit-cell type. For example, in one implementation, the first bitcell-type may be 20% larger in size as compared to the second bitcell type. In other implementations, the first bitcell-type may a fixed greater size in comparison to the second bitcell-type.

In certain implementations, bitcell-type "A" may include first and second versions. A first version of bitcell-type A (e.g., a first version of the first bitcell-type) may include a low power version, and a second version of bitcell-type A (e.g., a second version of the first bitcell-type) may include a high speed version. In one example, the high speed version (e.g., the second version) of bitcell-type A may be 10% "faster" (in terms of performance) and 100% "leakier" (in terms of leakage current) in comparison to the low power version (e.g., the first version). In other examples, the high speed version of bitcell-type A may include different percentage amounts of greater speed but also greater current leakage in comparison to the low power version of bitcell-type A. Moreover, in other implementations, bitcell-type A may include additional versions optimized for different performance and leakage.

Similar to bit-cell type "A", in certain implementations, bitcell-type "B" may also include first and second versions. A first version of bitcell-type B (e.g., a first version of the second bitcell-type) may include a low power version, and a second version of bitcell-type B (e.g., a second version of the second bitcell-type) may include a high speed version. In one example, the high speed version (e.g., the second version) of bitcell-type B may be 10% "faster" (in terms of performance) and 100% "leakier" (in terms of leakage current) in comparison to the low power version (e.g., the first version). In other examples, the high speed version of bitcell-type B may include different percentage amounts of greater speed but also greater current leakage in comparison to the low power version of bit-cell type B. Moreover, in other implementations, bitcell-type B may include additional versions optimized for different performance and leakage.

As an example, in one optimization mode (i.e., a VT-mode) tuned for "high performance" (i.e., "highspeed" application), the memory architecture 100 may be optimized with a high-speed version (e.g., high speed version of bitcell-type A) of the bit-cell, while the periphery logic (i.e., a logic design, logic threshold voltages, implant layers) may be optimized with "maximum" logic (e.g., more logic circuitry for faster operation) for lower predefined threshold voltages. Alternatively, in a second optimization mode tuned for "low power" application (i.e., low-leakage application) the memory architecture 100 may be optimized with a low power version of the bit-cell (e.g., low power version of bitcell-type A), while the periphery logic (i.e., a logic design, logic threshold voltages, implant layers) may be optimized with "maximum" logic (e.g., more logic circuitry for faster operation) for higher predefined threshold voltages. Advantageously, conversion between the high speed version and low power version of bitcell-type A may now be performed as each of these bit-cell versions have the same aspect ratio including: substantially identical bit-cell height, contacted poly pitch (CPP), and area.

As a second example, for another optimization mode tuned for highspeed application, the memory architecture 100 may alternatively be optimized with a a high speed version of bitcell-type B, and for another optimization mode tuned for low power application, the memory architecture 100 may alternatively be optimized with a low power version of bitcell-type B. Advantageously, conversion between the high speed and low power versions of bit-cell type B may now be performed as each of these bit-cell versions have the same aspect ratio including: substantially identical bit-cell height, contacted poly pitch (CPP), and area.

In addition, such inventive aspects as described herein provide for PPA improvements that would not be able to be met by previously known logic VT optimization. For instance, conversion from a first optimization mode (i.e., highspeed (HS) mode) to a second optimization mode (i.e., low power (LP) mode) (for both bitcell-types A and B) would lead to leakage improvement of greater than 50% and read-dynamic power improvement of approximately 30%.

In addition, conversion from the second optimization mode to the first optimization mode would lead to timing improvement (i.e., Tacc/Tcyc/setup improvement) of greater than 30%.

Referring back to FIG. 1, according to the inventive methods described herein, the two or more memory instances 120a, 120b may be optimized by switching from one bit-cell type to another, where each bit-cell type would have the same aspect ratio (e.g., size specifications based on ratio bitcell width and bitcell height). For example, high-speed bitcells of bitcell-type A of the memory instances 120a, 120b may be switched out for low power bitcells of bitcell-type A and vice-versa, while high-speed bitcells of bitcell-type B of the memory instances 120a, 120b may be switched out for low power bitcells of bitcell-type B and vice-versa.

Moreover, the periphery logic 142 (i.e., logic threshold voltage, implant layers) (e.g., the circuit design coupling the word-line decoder block 140 to the two or more memory instances 120a, 120b) may be optimized by the determination of a suitable threshold voltage-combination to target for current leakage or for performance. The determination of such a suitable threshold voltage-combination (i.e., logic designs) can be based on a user provided read current requirement (Iread) (i.e., whether the read current is above a certain user provided threshold level) and user provided leakage current requirement (Ileak) (i.e., whether the leakage current is above a certain user provided threshold level). In some implementations, the suitable threshold voltage-combination may be or may also be based and identified based on a user provided minimum assist voltage requirement (i.e., Vmin assist, user provided voltage threshold). Accordingly, based on user provided requirements, logic designs may be identified that either provide a "maximum" logic (e.g., the greater amount of logic circuitry for faster operation) for either "low" or "high" predefined threshold voltages.

Also, at the circuitry coupling of the word-line decoder block 140 to the two or more memory instances 120a, 120b, self-time tracking (STT) can be utilized for row tracking of the particular bit-cell of an example memory array) (e.g., bitcell arrays 120a, 120b). As discussed in below paragraphs, in certain examples, the STT feature may be provided as part of the inventive methods. In certain cases, the STT feature may offer to track a read current and determine whether it's below a predetermined read threshold according to a specified bit-cell type.

In addition, based on requirements for the memory optimization mode (i.e., VT-mode), for high speed (HS) modes (e.g., corresponding to bit-cell types A or B), the write assist logic blocks 130a, 130b (i.e., write assist logic design) can be removed from the memory architecture. Advantageously, in doing so, the memory architecture can realize approximately 3-5% area savings and approximately 13-15% less power utilization. In contrast, for low power (LP) modes (corresponding to either low power versions of bit-cell types A or B), the write assist logic blocks 130a, 130b would be included in the memory architecture design.

Figure 2:
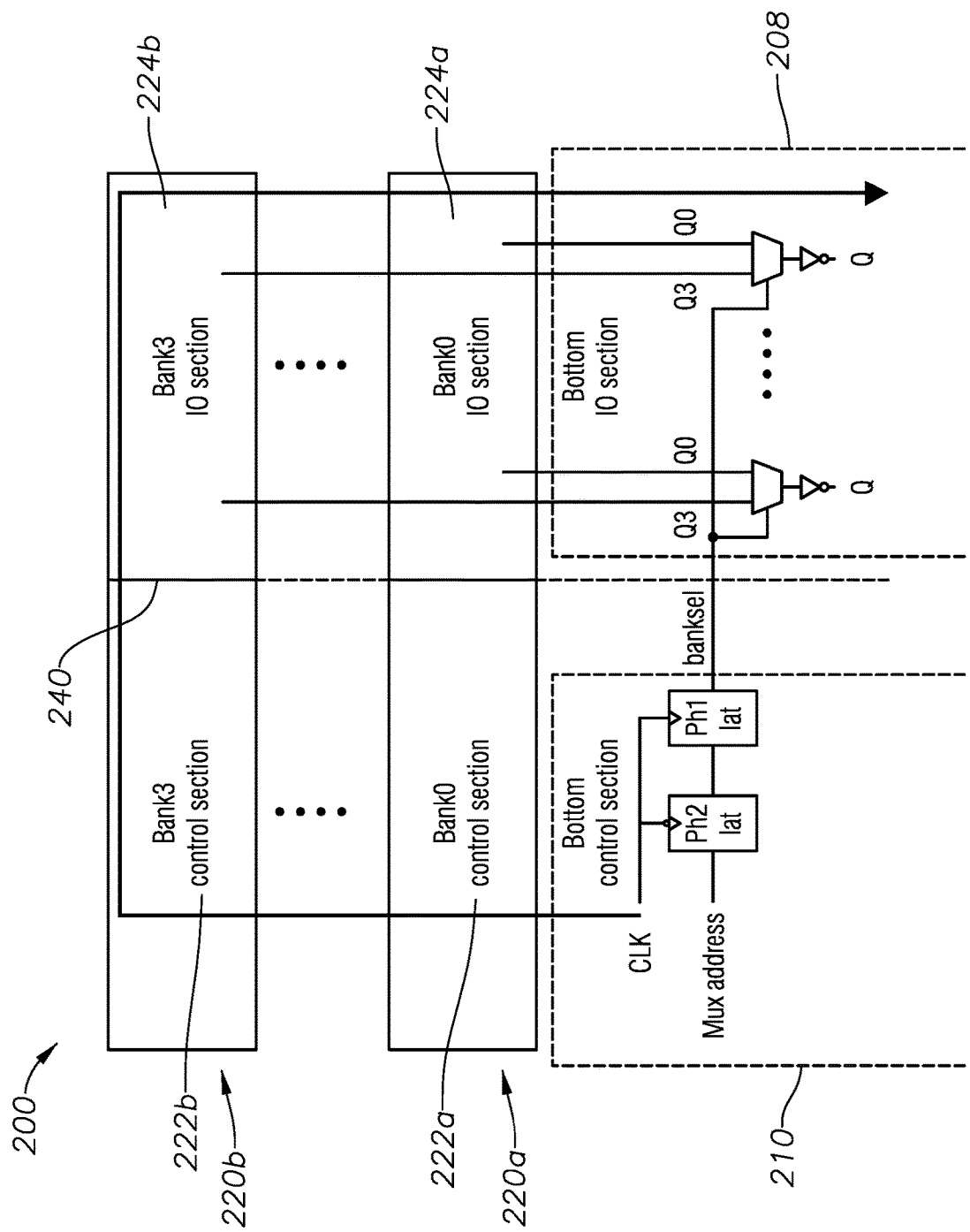
FIG. 2 is a schematic diagram of an integrated circuit in accordance with various implementations described herein.

Referring to FIG. 2, a portion of an example multi-bank memory architecture 200 is shown. In certain implementations, the multi-bank memory architecture 200 may be incorporated within the memory architecture 100 of FIG. 1. As illustrated, the multi-bank memory architecture 200 includes: a plurality of memory banks 220a, 220b, etc. (i.e., memory arrays) (e.g., memory bank0-bank3). For example, each of the plurality of memory banks 220a, 220b, etc. may be coupled to or include corresponding bank control sections 222a, 222b, etc. (i.e., bank control circuitry) and corresponding bank input/output sections 208a, 208b, etc. (i.e., I/O circuitry) for each of the plurality of memory banks 220a, 220b, etc. FIG. 2 further illustrates a control block 210 and an input (I/O) port 208 that are electrically coupled to the bank control sections 222a, 222b, etc. and the bank input/output sections 208a, 208b, etc. In certain implementations, the control section 210 and the I/O port 208 may be substantially similar to as a described with the control block 110 and I/O ports 108a, 108b in FIG. 1.

FIG. 2 also illustrates an access path 270. In multi-bank architecture, the performance of the memory (i.e., integrated circuit) would correspond to the "access time" (i.e., the time to access each of the bit-cells of the memory bank). Consequently, due to the wire RC delay in the path of critical signals, the access time may be generally limited by the "farthest bank" (e.g., the bank having the longest access path 270 and positioned furthest away from the control block 210).

Hence, accordingly to inventive aspects, by providing for a highspeed version of the bit-cell (e.g., either a highspeed version of bitcell-type A or a highspeed version of bitcell-type B) in the farthest bank and by optimizing the performance (e.g., by providing additional logic for faster operation) of the farthest bank to be substantially equal to that of the nearest bank, overall improvement in performance of the memory may be realized. Moreover, by incorporating such a feature, an 30% access time improvement of the farthest bank may be realized without impact on memory area. Additionally, in certain instances, to realize greater cost savings, the low power version of the bit-cell may be provided for the other nearer memory banks.

Figure 3:
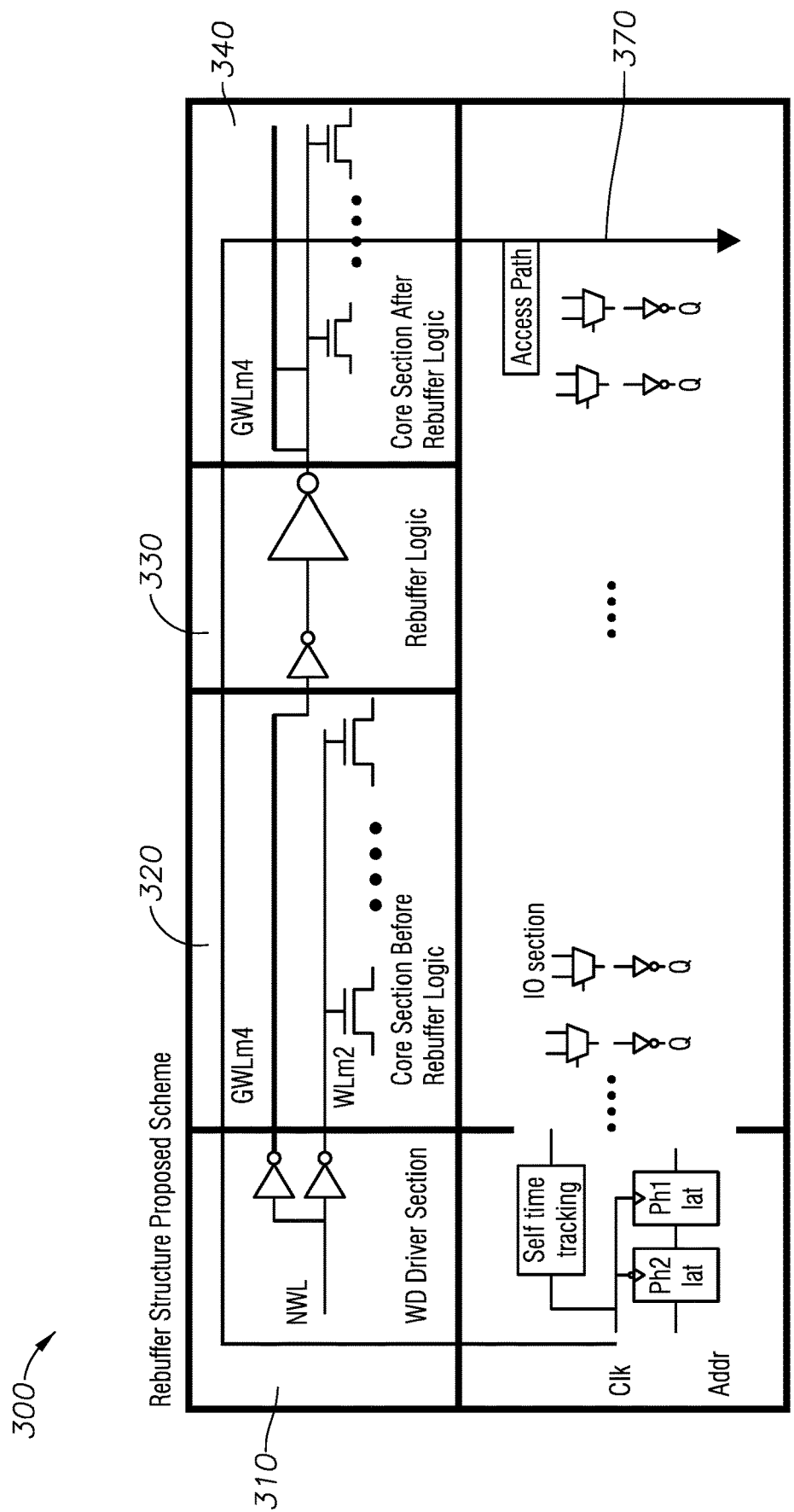
FIG. 3 is a schematic diagram of an integrated circuit in accordance with various implementations described herein.

Referring to FIG. 3, a portion of an example rebuffer circuit 300 (i.e., rebuffer, rebuffer structure) is shown. In certain implementations, the rebuffer circuit 300 may be implemented as part of the memory architecture 100 of FIG. 1. As illustrated, the example rebuffer circuit 300 includes a word line driver section (i.e., word line driver circuit) 310, a first memory array portion (i.e., core-section "before" rebuffer logic) 320, a rebuffer logic 330, and a second memory array portion 340 (i.e., core-section "after" rebuffer logic). Also shown in FIG. 3, an access path 370 may transfer signals through each of these above-mentioned circuit sections in order.

In operation, in order to support larger number of memory bitcell columns, a rebuffer structure 300 can be inserted in between the first and second memory array portions 320, 340. The rebuffer structure 300 can be utilized to improve resistor-capacitor (RC) dominated wordline (WL) signal slope. Nevertheless, the performance of a rebuffer structure in a memory architecture (i.e., a memory instance) is limited by the "furthest" bitcells (i.e., the bitcells at the furthest point of the wordline away from the control block (not shown) of the circuit 300). Hence, accordingly to inventive aspects, by providing for a highspeed version of the bit-cell (e.g., either a highspeed version of bitcell-type A or a highspeed version of bitcell-type B) "after" the rebuffer logic 330 (e.g., at a greater/further distance from the circuit 300 along the access path in comparison to the first memory array portion 320), the performance of the farthest bitcells (i.e., access time performance) can be improved, and thus, improvement in performance would be realized for the overall memory instance without an impact on memory area. Additionally, in certain instances, to realize greater cost savings, the low power version of the bit-cell may be provided for the other nearer memory array portions.

Figure 4:
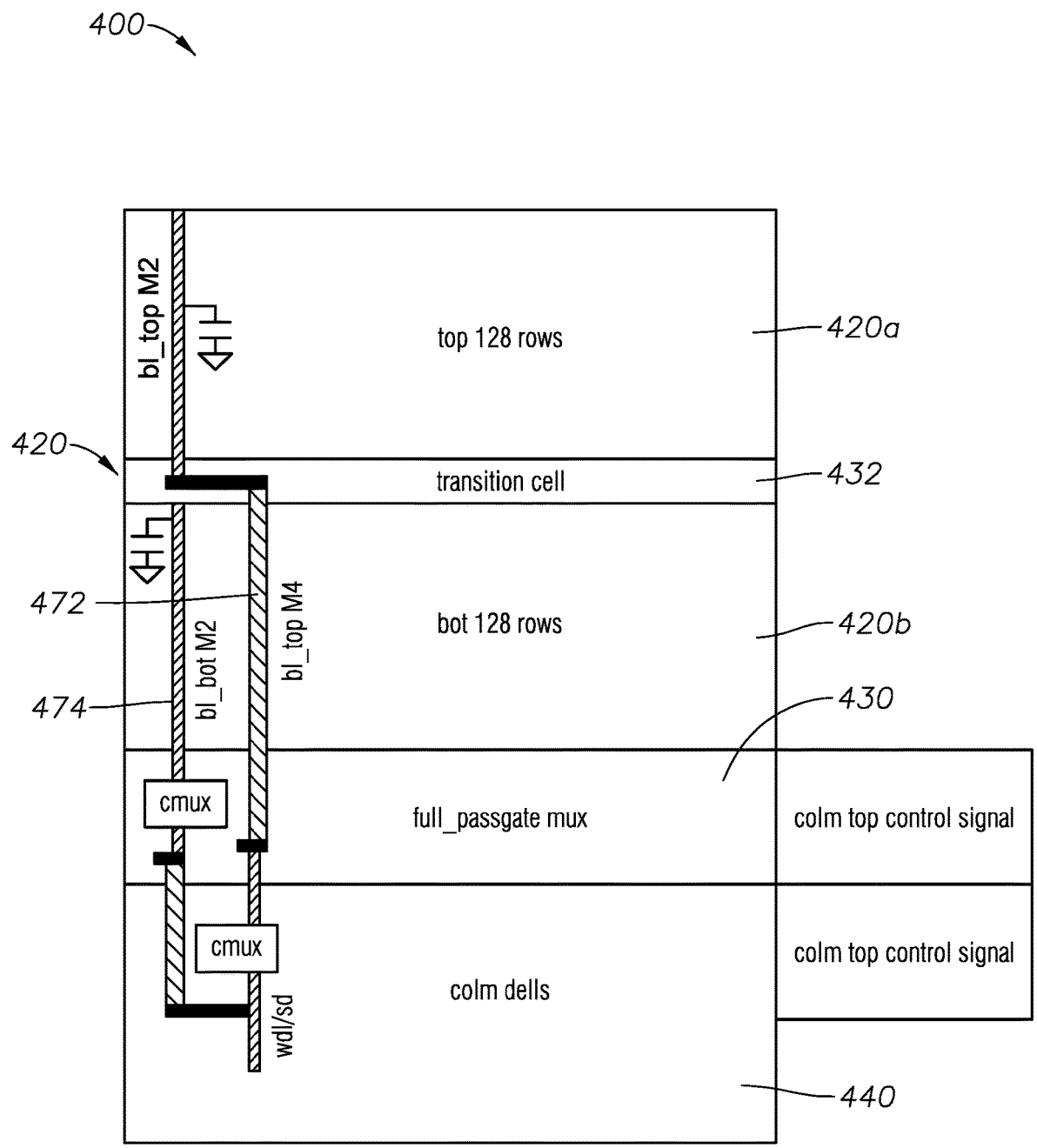
FIG. 4 is a schematic diagram of an integrated circuit in accordance with various implementations described herein.

Referring to FIG. 4, a portion of an example memory architecture 400 for flexible bitline is shown. In certain implementations, the memory architecture 400 may be implemented as part of the memory architecture 100 of FIG. 1. As illustrated, the example memory architecture 400 includes a first memory array portion 420a and a second memory array portion 420b. Also illustrated in FIG. 4, a full passage multiplexer 430, a transition cell 432, column bitcells 440, and top half bitlines (on a higher metal layer (e.g., M4 layer)) 472, and bottom half bitlines (on a lower metal layer (e.g., M2 layer)) 474.

In operation, when this feature is on, a bitcell array 420 (i.e., memory array, memory instance) with n-rows may be divided into two arrays with n/2 rows (e.g., first and second memory array portions 420a, 420b). Next, the bitlines of the top half array (e.g., first memory array portion 420a) may be routed with a higher layer metal 472 (e.g., bl_top M4). Also, an additional multiplexer 430 may be added between the bitcell array 420 and column bitcells 440 to provide for the additional multiplexer 430 to select either the bitlines from the top half (e.g., bl_top M4) or bottom half (e.g., bl_bot M2) of the bitcell array 420. Implementation of a memory architecture including such a flexible bitline can provide a performance and power benefits. Nevertheless, in doing so, there would be an increase in area requirement with inclusion of a transition cell 432 and the additional multiplexer 430. Hence, accordingly to inventive aspects, by providing for a highspeed version of the bit-cell (e.g., either a high-speed version of bitcell-type A or a highspeed version of bitcell-type B) for the top 128 rows (i.e., for the first memory array portion 420a) of the memory instance 420, the performance of the farthest bitcells (i.e., access time performance) can be improved, and thus, improvement in performance would be realized for the overall memory instance 420 without an impact on memory area. Additionally, in certain instances, to realize greater cost savings, the low power version of the bit-cell may be provided for the nearer memory array portion 420b (e.g., the bottom 128 rows).

Figure 5:
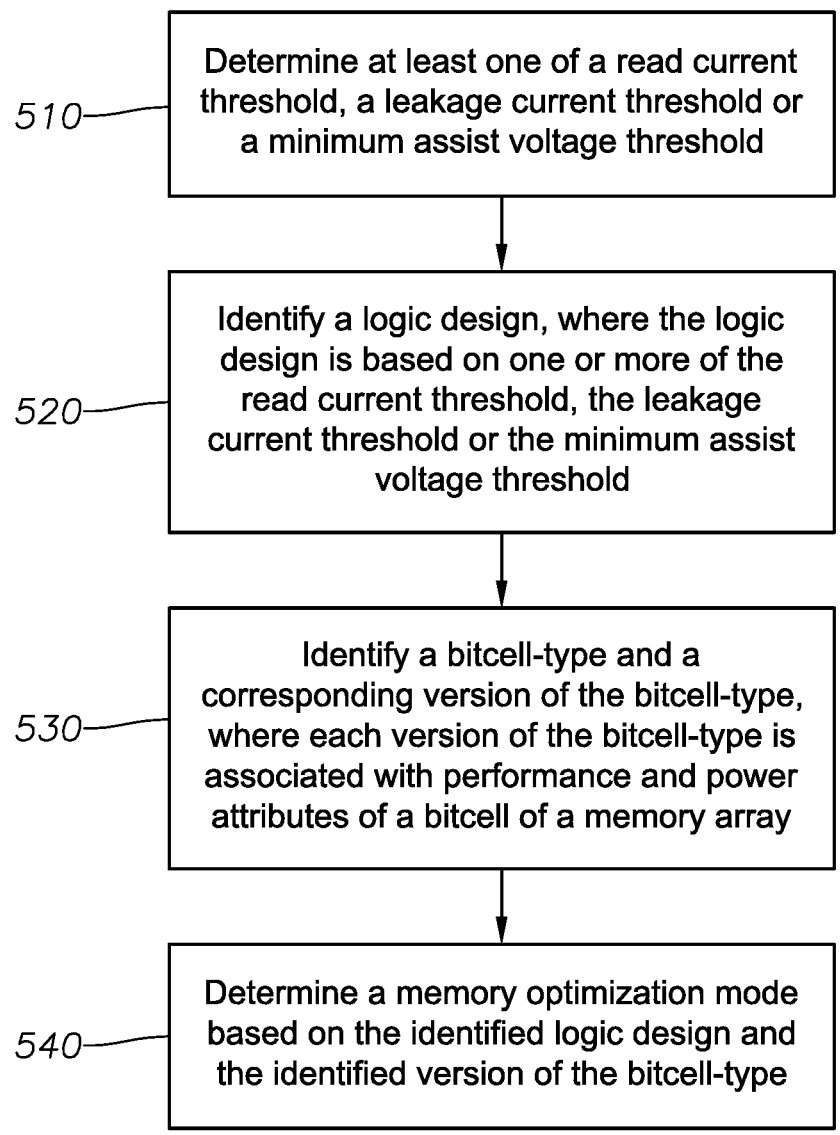
FIG. 5 is an operation method in accordance with various implementations described herein.

Referring to FIG. 5, a flowchart of an example operational method 500 (i.e., procedure) to automatically optimize a memory compiler (e.g., a graphical user interface (GUI) option) is shown. Advantageously, in various implementations, the method 500 may flexibly account for power and leakage requirements of memory architecture in real-time. The method 500 may be implemented with reference to circuit implementations as shown in FIGS. 1-4 and 6.

At block 510, the method includes determining one of a read current threshold (i.e., Iread requirement), a leakage current threshold (i.e., Ileak requirement), or a minimum assist voltage threshold (i.e., Vmin assist). For instance, with reference to various implementations as described in FIGS. 1-4 and 6, a central processing unit (as shown in FIG. 5) may execute software instructions based on one or more of provided or predetermined read current requirements, leakage current requirements and/or minimum assist voltage requirements.

At block 520, the method includes identifying a logic design, where the logic design may be based on the read current threshold, the leakage current threshold, or the minimum assist voltage threshold. For example, with reference to various implementations as described in FIGS. 1-4 and 6, a logic design (i.e., a periphery logic/circuit design (i.e., logic threshold voltages, implant layers)) (to target for leakage and performance) may be identified, where each logic design may be based on the determined read current threshold, the determined leakage current threshold, or the minimum assist voltage threshold.

At block 530, the method includes identifying a bitcell-type and corresponding version, where each version of a bit-cell-type may be associated with a different threshold voltage variation) of a bitcell of a memory array. For example, with reference to various implementations as described in FIGS. 1-4 and 6, a bit-cell type and corresponding version (e.g., one of respective first and second versions of bitcell types A or B) may be identified, where each bitcell-type is associated with different performance and power attributes of a bitcell of a memory array.

At block 540, the method includes determining a memory optimization mode based on the identified logic design and the identified bitcell-type. For example, with reference to various implementations as described in FIGS. 1-4 and 6, a memory optimization mode (e.g., optimized for high performance or low power) (i.e., memory specific voltage threshold modes) may be determined based on the identified logic design and the identified bitcell-type. In various implementations, the memory optimization mode comprises either high speed optimization mode, or low power optimization mode.

Also, according to other aspects of the operational method, an output may be generated based on the determined memory optimization mode. For example, with reference to various implementations as described in FIGS. 1-4 and 6, an output (i.e., an integrated circuit design) (e.g., a memory architecture, multi-threshold offerings for memory compilers) may be generated based on the determined memory optimization mode.

Figure 6:
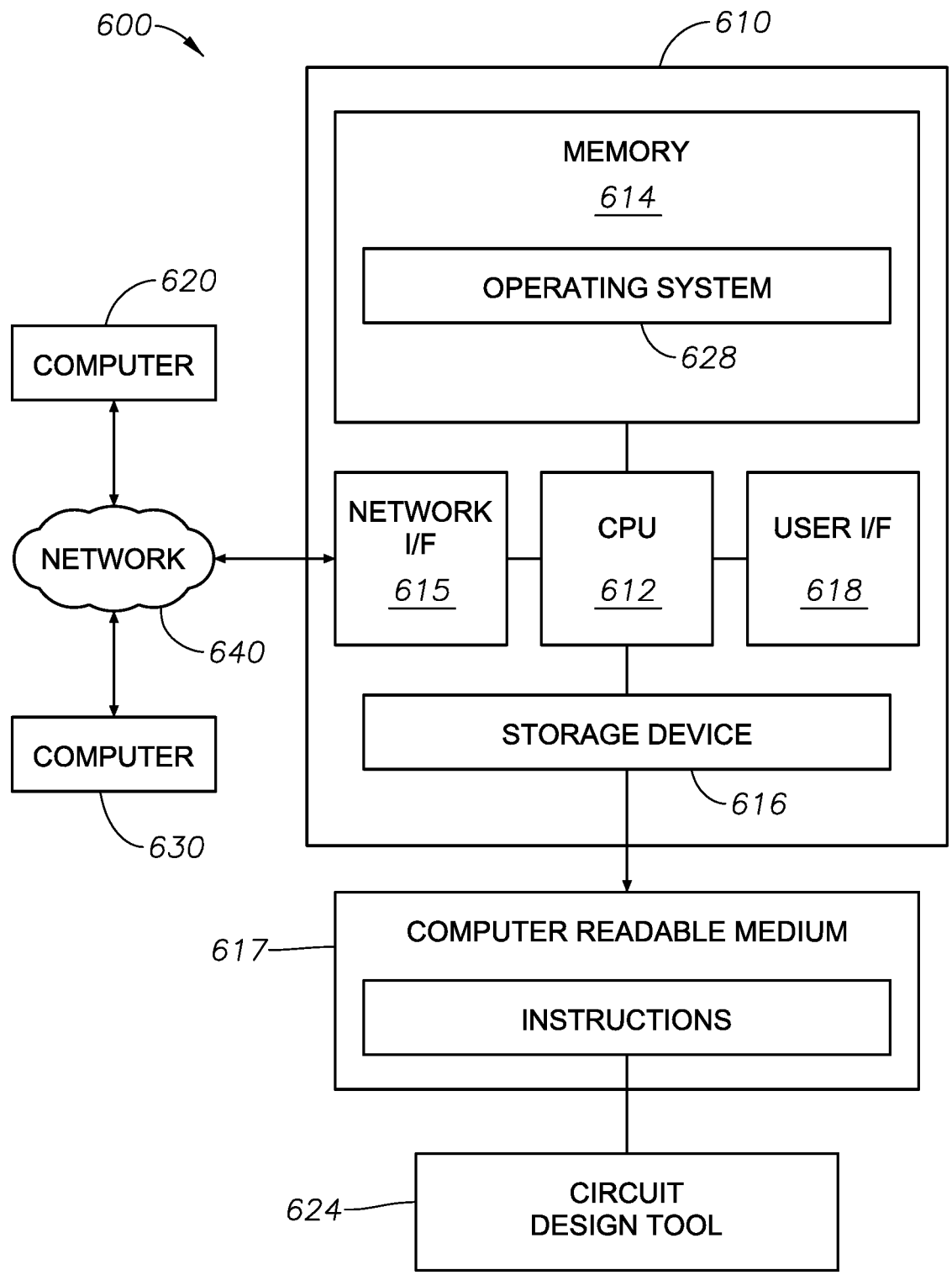
FIG. 6 is a block diagram in accordance with various implementations described herein.

FIG. 6 illustrates example hardware components in the computer system 600 that may be used to determine a memory optimization mode including (various intermediary steps) and generate an integrated circuit design/memory architecture output. In FIG. 6, in certain implementations, the example computer system 600 (e.g., networked computer system and/or server) may include circuit design tool 624) and execute software based on the procedure as described with reference to the flowchart 500 in FIG. 5 and the method 500.

The circuit design tool 624 may provide generated computer-aided physical layout designs for memory architecture. The procedure 500 may be stored as program code as instructions 617 in the computer readable medium of the storage device 616 (or alternatively, in memory 614) that may be executed by the computer 610, or networked computers 620, 630, other networked electronic devices (not shown) or a combination thereof. In certain implementations, each of the computers 610, 620, 630 may be any type of computer, computer system, or other programmable electronic device. Further, each of the computers 610, 620, 630 may be implemented using one or more networked computers, e.g., in a cluster or other distributed computing system.

In certain implementations, the system 600 may be used with semiconductor integrated circuit (IC) designs that contain all standard cells, all blocks or a mixture of standard cells and blocks. In a particular example implementation, the system 600 may include in its database structures: a collection of cell libraries, one or more technology files, a plurality of cell library format files, a set of top design format files, one or more Open Artwork System Interchange Standard (OASIS/OASIS.MASK) files, and/or at least one EDIF file. The database of the system 600 may be stored in one or more of memory 614 or storage devices 616 of computer 610 or in networked computers 620, 620.

The system 600 may perform the following functions automatically, with variable user input: determination of read current requirements/thresholds (i.e., Iread), determination of leakage current requirements/thresholds (i.e., Ileak), identification of logic designs (i.e., periphery circuit designs (i.e., logic threshold voltages, threshold voltage implant layers)), determination of a desired threshold voltage—combination, determination of minimum voltage assist requirements (i.e., Vmin assist), identification of bit-cell types, determination of memory specific optimization modes (memory optimization mode), floor-planning, including generation of cell regions sufficient to place all standard cells; standard cell placement; power and ground net routing; global routing; detail routing and pad routing. In some instances, such functions may be performed substantially via user input control. Additionally, such functions can be used in conjunction with the manual capabilities of the system 600 to produce the target results that are required by a designer. In certain implementations, the system 600 may also provide for the capability to manually perform functions such as: cell region creation, block placemat, pad and cell placement (before and after automatic placement); net routing before and after automatic routing and layout editing. Moreover, verification functions included in the system 700 may be used to determine the integrity of a design after, for example, manual editing, design rule checking (DRC) and layout versus schematic comparison (INS).

In one implementation, the computer 600 includes a central processing unit (CPU) 612 having at least one hardware-based processor coupled to a memory 614. The memory 614 may represent random access memory (RAM) devices of main storage of the computer 610, supplemental levels of memory (e.g., cache memories, non-volatile or backup memories (e.g., programmable or flash memories)), read-only memories, or combinations thereof. In addition to the memory 614, the computer system 600 may include other memory located elsewhere in the computer 610, such as cache memory in the CPU 612, as well as any storage capacity used as a virtual memory (e.g., as stored on a storage device 616 or on another computer coupled to the computer 610).

The computer 610 may further be configured to communicate information externally. To interface with a user or operator (e.g., a circuit design engineer), the computer 610 may include a user interface (I/F) 618 incorporating one or more user input devices (e.g., a keyboard, a mouse, a touchpad, and/or a microphone, among others) and a display (e.g., a monitor, a liquid crystal display (LCD) panel, light emitting diode (LED), display panel, and/or a speaker, among others). In other examples, user input may be received via another computer or terminal. Furthermore, the computer 610 may include a network interface (I/F) 615 which may be coupled to one or more networks 640 (e.g., a wireless network) to enable communication of information with other computers and electronic devices. The computer 660 may include analog and/or digital interfaces between the CPU 612 and each of the components 614, 615, 616, and 618. Further, other non-limiting hardware environments may be used within the context of example implementations.

The computer 610 may operate under the control of an operating system 626 and may execute or otherwise rely upon various computer software applications, components, programs, objects, modules, data structures, etc. (such as the programs associated with the procedure 600 and the method 600 and related software). The operating system 628 may be stored in the memory 614. Operating systems include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 626 in the example of FIG. 6 is shown in the memory 614, but components of the aforementioned software may also, or in addition, be stored at non-volatile memory (e.g., on storage device 616 (data storage) and/or the non-volatile memory (not shown). Moreover, various applications, components, programs, objects, modules, etc. may also execute on one or more processors in another computer coupled to the computer 610 via the network 640 (e.g., in a distributed or client-server computing environment) where the processing to implement the functions of a computer program may be allocated to multiple computers 620, 630 over the network 640.

In example implementations, certain cell layout diagrams have been provided in FIGS. 1-6, whose redundant description has not been duplicated in the related description of analogous cell layout diagrams. It is expressly incorporated that the same cell layout diagrams with identical symbols and/or reference numerals are included in each of embodiments based on its corresponding figure(s).

Although one or more of FIGS. 1-6 may illustrate systems, apparatuses, or methods according to the teachings of the disclosure, the disclosure is not limited to these illustrated systems, apparatuses, or methods. One or more functions or components of any of FIGS. 1-6 as illustrated or described herein may be combined with one or more other portions of another of FIGS. 1-6. Accordingly, no single implementation described herein should be construed as limiting and implementations of the disclosure may be suitably combined without departing form the teachings of the disclosure.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. For example, the memory 614, the storage device 616, or both, may include tangible, non-transitory computer-readable media or storage devices.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

What is claimed is:

1. A method comprising:
   determining one or more of a read current threshold, leakage current threshold or a minimum assist voltage threshold;
   identifying a logic design, wherein the logic design is based on the one or more of the read current threshold, the leakage current threshold, or the minimum assist voltage threshold;
   identifying a bitcell-type and a corresponding version of the bitcell-type, wherein each version of the bitcell-type is associated with performance and power attributes of a bitcell of a memory array; and
   determining a memory optimization mode based on the identified logic design and the identified version of the bitcell-type.

2. The method of claim 1, further comprising:
   generating an output based on the determined memory optimization mode.

3. The method of claim 2, further comprising:
   providing self-time tracking (STT) of a read current below the read current threshold, wherein the self-time tracking corresponds to row tracking of the bitcell, and wherein the generated output is determined based on the provided self-time tracking.

4. The method of claim 2, wherein the memory array comprises a plurality of memory banks of a multi-bank integrated circuit, wherein the plurality of memory banks comprise first bitcells and second bitcells, and wherein the first bitcells are positioned at a greater distance in comparison to the second bitcells on an access path from a control circuit of the integrated circuit.

5. The method of claim 4, further comprising:
   providing a high-speed version of the bitcell-type for the first bitcells of the plurality of memory banks.

6. The method of claim 2, wherein the memory array comprises first and second memory array portions, wherein a rebuffer is positioned between first and second memory array portions, and wherein the second memory array portion is positioned at a greater distance in comparison to the first memory array portion on an access path from a control circuit of the integrated circuit.

7. The method of claim 6, further comprising:
   providing a high-speed version of the bitcell-type for bitcells of the second memory array portion.

8. The method of claim 2, wherein the memory array comprises first and second memory array portions, wherein each of the first and second memory array portions comprises half of the rows of the memory array, and wherein the first memory array portion is positioned at a greater distance in comparison to the second memory array portion on an access path from a control circuit of the integrated circuit.

9. The method of claim 8, further comprising:
   providing a high-speed version of the bitcell-type for a plurality of bitcells of the first memory array portion.

10. The method of claim 1, wherein the bitcell-type comprises at least first and second bitcell-types, wherein the first bitcell-type comprises a greater size than the second bit-cell type, and wherein each of the first and second bitcell-types comprise at least two versions, where the at least two versions comprise a low power version and a high speed version.

11. The method of claim 1, wherein the memory optimization mode comprises a high-speed (HS) mode or a low power mode (LP).

12. The method of claim 11, further comprising:
   determining whether to remove a write-assist logic design, wherein the write-assist logic design is removed in the high speed (HP) memory optimization mode.

13. The method of claim 1, wherein the versions of each bitcell-type comprise approximately equivalent aspect ratios.

14. A computer-readable storage medium comprising instructions that, when executed by a processor, cause the processor to perform operations including:
   determining one or more of a read current threshold, a leakage current threshold or a minimum assist voltage threshold;
   identifying a logic design, wherein the logic design is based the on one or more of the read current threshold, the leakage current threshold, or the minimum assist voltage threshold;
   identifying a bitcell-type and a corresponding version of the bitcell-type, wherein each version of the bitcell-type is associated with performance and power attributes of a bitcell of a memory array; and
   determining a memory optimization mode based on the identified logic design and the identified version of the bitcell-type.

15. The computer-readable storage medium of claim 14, wherein the operations further comprising:
   generating an output based on the determined memory optimization mode.

16. The computer-readable storage medium of claim 14, wherein the operations further comprising:
   providing the output to an integrated circuit design tool.

17. An apparatus comprising:
   a computer-readable storage medium;
   at least one processor; and
   program code stored on the computer-readable storage medium and configured upon execution by the at least one processor to generate an integrated circuit design, wherein the program code is configured to: determine one or more of a read current threshold, a leakage current threshold or a minimum assist voltage threshold; identify a logic design, wherein the logic design is based on the one or more of the read current threshold, the leakage current threshold, or the minimum assist voltage threshold; identify a bitcell-type and a corresponding version of the bitcell-type, wherein each version of the bitcell-type is associated with performance and power attributes of a bitcell of a memory array; and determine a memory optimization mode based on the identified logic design and the identified version of the bitcell-type.

18. The apparatus of claim 17, wherein the program code is configured to generate an output based on the determined memory optimization mode.

19. The apparatus of claim 17, wherein the program code is configured to provide the output to an integrated circuit design tool.

20. The apparatus of claim 17, wherein the bitcell-type comprises at least first and second bitcell-types, wherein the first bitcell-type comprises a greater size than the second bit-cell type, and wherein each of the first and second bitcell-types comprise at least two versions, wherein the at least two versions comprise a low power version and a high speed version, and wherein the memory optimization mode comprises a high-speed (HS) mode, or a low power (LP) mode.

\* \* \* \* \*